United States Patent [19]
Wilford et al.

[11] Patent Number: 5,509,006
[45] Date of Patent: Apr. 16, 1996

[54] APPARATUS AND METHOD FOR SWITCHING PACKETS USING TREE MEMORY

[75] Inventors: Bruce A. Wilford, Los Altos, Calif.; Bruce Sherry, Woodinville, Wash.; David Tsiang, Menlo Park; Anthony Li, Sunnyvale, both of Calif.

[73] Assignee: Cisco Systems Incorporated, Menlo Park, Calif.

[21] Appl. No.: 229,289

[22] Filed: Apr. 18, 1994

[51] Int. Cl.⁶ .................................................. H04L 12/56
[52] U.S. Cl. ........................ 370/60; 370/85.13; 395/412
[58] Field of Search ...................... 370/60.1, 60, 94.1, 370/58.1, 58.2, 58.3, 61, 85.13, 85.8, 85.9, 94.2, 94.3, 110.1, 112, 14, 13, 54, 55, 56, 67, 68.1; 340/825.01, 825.02, 825.03; 364/222.2; 395/400, 575, 425, 575, 600, 250, 165, 168, 410, 412, 413, 415, 416, 417, 824, 829, 833, 497.01, 497.04, 726, 727, 728, 741, 846, 200.07

[56] References Cited

U.S. PATENT DOCUMENTS

| | | | |
|---|---|---|---|
| 4,131,767 | 12/1978 | Weinstein et al. | 379/411 |
| 4,161,719 | 7/1979 | Parikh et al. | 375/365 |
| 4,316,284 | 2/1982 | Howson | 370/105 |
| 4,397,020 | 8/1983 | Howson | 370/105 |
| 4,419,728 | 12/1983 | Larson | 395/309 |
| 4,424,565 | 1/1984 | Larson | 395/200.07 |
| 4,439,763 | 3/1984 | Limb | 340/825.5 |
| 4,445,213 | 4/1984 | Baugh et al. | 370/94 |
| 4,446,555 | 5/1984 | Devault et al. | 370/94.1 |
| 4,456,957 | 6/1984 | Schieltz | 395/824 |
| 4,464,658 | 8/1984 | Thelen | 340/825.5 |
| 4,499,576 | 2/1985 | Fraser | 370/60 |
| 4,507,760 | 3/1985 | Fraser | 365/221 |
| 4,532,626 | 7/1985 | Flores et al. | 370/85 |
| 4,763,191 | 8/1988 | Gordon et al. | 348/7 |
| 4,893,306 | 1/1990 | Chao et al. | 370/94.2 |
| 4,933,937 | 6/1990 | Konihi | 370/85.13 |
| 5,003,595 | 3/1991 | Collins et al. | 380/25 |
| 5,033,076 | 7/1991 | Jones et al. | 379/67 |
| 5,136,580 | 8/1992 | Videlock et al. | 370/60 |
| 5,199,049 | 3/1993 | Wilson | 375/351 |
| 5,212,686 | 5/1993 | Joy et al. | 370/60 |
| 5,226,120 | 7/1993 | Brown et al. | 395/200.11 |
| 5,229,994 | 7/1993 | Balzano et al. | 370/85.13 |
| 5,237,564 | 8/1993 | Lespagnol et al. | 370/60.1 |

(List continued on next page.)

FOREIGN PATENT DOCUMENTS

| | | | |
|---|---|---|---|
| WO93/07692 | 4/1993 | WIPO | H04J 3/24 |
| WO93/07569 | 4/1993 | WIPO | G06F 3/40 |
| WO9401828 | 1/1994 | WIPO . | |

OTHER PUBLICATIONS

Application Ser. No. 08/081,646, "Messange Header Classifier," William R. Crowther, et al.

Pei, T.–B. & C. Zukowski, "Putting Routing Tables in Silicon", IEEE Network Magazine (Jan. 1992), p. 42.

Tsuchiya, P. F., "A Search Algorithm for Table Entries with Non-Contiguous Widlcarding".

*Primary Examiner*—Benedict V. Safourek
*Assistant Examiner*—Dang Ton
*Attorney, Agent, or Firm*—D'Alessandro & Ritchie

[57] ABSTRACT

A device for switching packets at high speed. For each packet, the A device matches packet data with protocols, to determine how to switch the packet. Matching of data with protocols is highly parallel; the device simultaneously retrieves a data byte, compares a data byte with a protocol byte, tests a comparison result, and executes a processor instruction. A switching engine having a comparator and a decision tree memory. The comparator includes three outputs for indicating a comparison result (less-than, equal-to, or greater-than). The tree memory includes three corresponding banks of addressable memory. Each memory location comprises an entry for a next location, an entry for a next protocol byte, and an entry for a processor instruction. A set of protocol tests are assembled into the tree memory, and a set of routing tables are dynamically generated into the tree memory.

36 Claims, 9 Drawing Sheets

U.S. PATENT DOCUMENTS

| | | | |
|---|---|---|---|
| 5,249,178 | 9/1993 | Kurano et al. | 370/60 |
| 5,260,933 | 11/1993 | Rouse | 370/14 |
| 5,260,978 | 11/1993 | Fleischer et al. | 375/354 |
| 5,271,004 | 12/1993 | Proctor et al. | 370/60 |
| 5,283,783 | 2/1994 | Nguyen et al. | 370/16.1 |
| 5,291,482 | 3/1994 | McHarg et al. | 370/60 |
| 5,305,311 | 4/1994 | Lyles | 370/60 |
| 5,307,343 | 4/1994 | Bostica et al. | 370/60 |
| 5,311,509 | 5/1994 | Heddes et al. | 370/60 |
| 5,319,644 | 6/1994 | Liang | 370/85.5 |
| 5,331,637 | 7/1994 | Francis et al. | 370/54 |
| 5,361,250 | 11/1994 | Truonh et al. | 370/16.1 |
| 5,361,256 | 11/1994 | Doeringer et al. | 370/60 |
| 5,390,170 | 2/1995 | Sawant et al. | 370/58.1 |
| 5,400,325 | 3/1995 | Chatwani et al. | 370/60.1 |
| 5,408,469 | 4/1995 | Opher et al. | 370/60.1 |

ACCESS CONTROL LIST 751

| TYPE | PERMISSIONS | SET OF HOST ADDRESSES |
|---|---|---|
| "1" | "PERMIT" | "160.89.32.1" |
| "101" | "PERMIT IP", "DENY TCP" | "131.108.0.0", "0.0.255.2" |
| ⋮ | | |

APPARATUS AND METHOD FOR SWITCHING PACKETS USING TREE MEMORY

BACKGROUND OF THE INVENTION

1. Field of the Invention

This invention relates to packet switching.

2. Description of Related Art

When it is desired to transmit information from one computing device to another, it is known to transmit that information over a network. A network may include a set of computing devices coupled to a communication path, so that each device may communicate with other devices, and a communication protocol and a set of destination addresses, so that each device may recognize communications directed to it. In many networks, each message may be broken into well defined elements, called packets, which may be independently transmitted from a source device to a destination device. Each packet may generally comprise a packet header, with information relating to transmission and routing, and a packet body, with the data to be transmitted.

When it is desired to couple two networks, it is known to provide a switching device which is coupled to both networks, and which may receive packets from one network and retransmit those packets (possibly in another format) to a destination device on the other network. The switching device must generally recognize packets on one network which are addressed to devices on the other, and must generally maintain information about which devices are on which network so it may identify packets that must be copied.

When the two networks that are coupled have different network protocols, the switching device must generally be able to recognize both protocols, and must generally be able to identify the destination of packets encapsulated in each protocol. Because many network protocols are quite different, the switching device may be required to process a substantial part of each packet before it is able to identify the packet's protocol and destination. It would be advantageous for the switching device to do this as quickly as possible.

One method of the prior art is to provide the switching device with an associative memory; the initial part of the packet may then be compared simultaneously with several different expected packet headers. While this method is able to quickly recognize a small section of the packet header, such as that required for bridging, it is subject to the drawback that the extra bytes that must be matched in order for routing would make it very expensive, due to the increased width of the associative memory. Moreover, packets with variable length addresses, such as CLNP, or protocols that have variable length encapsulations, such as IPX, would require all possible combinations to be included in the associative memory; this would also be very expensive because of the increased memory requirement.

Other methods of the prior art do not achieve the simultaneous objectives of being fast, inexpensive, and having general applicability to various types of switching tasks.

Accordingly, it is an object of the invention to provide improved apparatus for packet switching.

SUMMARY OF THE INVENTION

The invention provides specialized apparatus capable of switching packets at high speed. For each packet, the apparatus may match packet data with a set of protocols, to determine how to switch the packet. In a preferred embodiment, matching of data with protocols may be highly parallel, so that the apparatus may simultaneously retrieve a data byte, compare a data byte with a protocol byte, test a comparison result, and execute a processor instruction. Apparatus comprising the invention is capable of processing many more (up to three to four times as many) packets in each instruction cycle as known packet switching devices.

In a preferred embodiment, the invention may comprise a comparator and a decision tree memory, defined herein. The comparator may comprise a plurality of (preferably three) outputs for indicating a comparison result (preferably less-than, equal-to, or greater-than). The decision tree memory may comprise a plurality of banks of addressable memory, each bank being responsive to at least one comparator output. Each memory location may preferably comprise an entry for a next location, an entry for a next data value for a next comparison, and an entry for a processor instruction.

In a preferred embodiment, the invention may further comprise a set of network interface tables, inserted into the decision tree memory, a set of network address tests, assembled or generated into the decision tree memory, and a set of protocol routing tables responsive to network data, dynamically assembled or generated into the decision tree memory.

DESCRIPTION OF THE PREFERRED EMBODIMENT

Inventions described herein may be made or used in conjunction with inventions described, in whole or in part, in the following patents, publications, or co-pending applications, hereby incorporated by reference as if fully set forth herein:

U.S. Pat. No. 5,088,032, issued in the name of inventor Leonard titled "Method and Apparatus for Routing Communications Among Computer Networks".

Computer Network Environment

Figure 1:
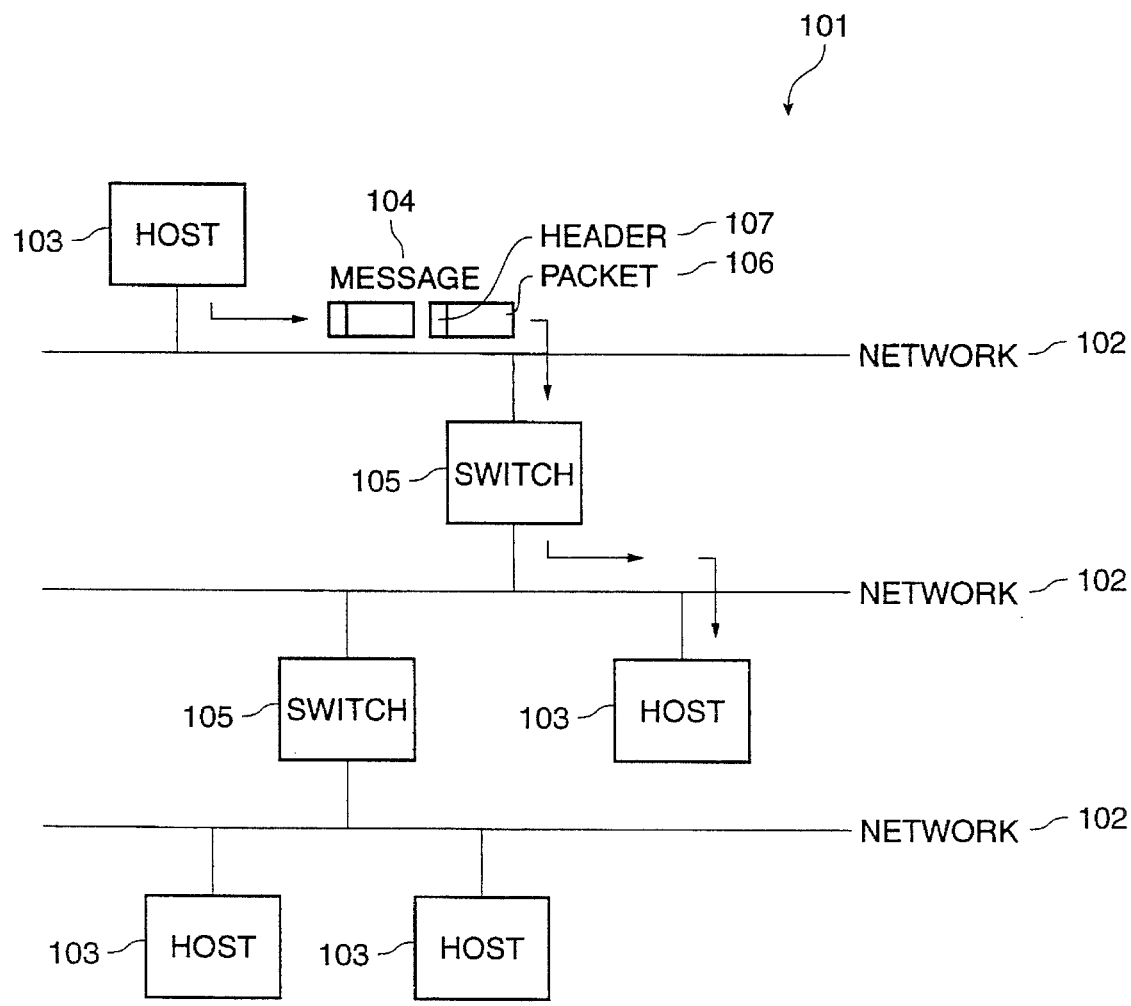
FIG. 1 shows a block diagram of a network comprising a packet switch.

FIG. 1 shows a block diagram of a network comprising a packet switch.

In a preferred embodiment, the invention may be used in conjunction with a computer network environment such as that shown in FIG. 1. (Those skilled in the art would recognize, after perusal of this application, that the environment shown in FIG. 1 is just an example, and that the invention would also work with other environments.) A network environment 101 may comprise a communication network 102 to which is coupled at least one host 103. Each host 103 may comprise a computer or another device which is capable of receiving a message 104 from the network and recognizing if that message 104 is addressed to that host 103. At least one host 103 must also be capable of sending a message 104 onto the network and addressing that message 104 for a destination.

Computer networks are known in the art, so this application does not describe any particular network in detail. Those skilled in the art would recognize, after perusal of this application, that the invention would work with several known networks, such as Ethernet, FDDI, Token Ring, X.25, and other known networks (both LAN and WAN), and that description of particular details of each such network is not generally required for understanding how to make and use the invention.

In a preferred embodiment, the network environment 101 may comprise a plurality of networks 102, which may possibly be the same kind (e.g., each network 102 may comprise an Ethernet), or may possibly be different kinds (e.g., a first network 102 may comprise an Ethernet, while a second network 102 may comprise a Token Ring). A pair of networks 102 may be linked by a switching device 105, sometimes called "bridge", "gateway", "router", or "brouter". As used herein, a "switch" may comprise any of these, and more generally may comprise any switching device 105 capable of receiving packets from a network 102 and retransmitting them (possibly in another form or with another protocol, although in a preferred embodiment the header is changed but the protocol remains the same) on a network 102.

It is explicitly contemplated that a switch 105 may be coupled to the same network 102 twice, such as for retransmission of certain classes of packets to a designated set of recipients. However, in the usual case, a switch 105 may be coupled to two or more networks 102, for retransmission of packets from one network 102 to the other, and possibly vice versa. Where a switch 105 is coupled to more than two networks 102, it is sometimes convenient to treat it as a collection of switches 105 for pairwise coupling those networks 102.

In a preferred embodiment, a source host 103 on a first network 102 may send a message 104 to a destination host 103 on a second network 102, by means of a switch 105. The source host 103 may send the message 104 on the first network 102, addressing the message 104 to the destination host 103. The switch 105 may receive the message 104 and recognize that it should be retransmitted ("switched") to the second network 102. The switch 105 may then retransmit the message 104 on the second network 102; this may involve re-encapsulating data from the message 104 into the protocol format used on the second network 102. The destination host 103 may then receive the (retransmitted) message 104.

In a preferred embodiment, action by the switch 105 in receiving, recognizing, and retransmitting the message 104 may be transparent to the source host 103 and the destination host 103. However, some network protocols may provide for the source host 103 to describe, or even force, an internetwork path for the message 104 to be transmitted to the destination host 103. Moreover, more than one switch 105 may be involved in transmitting the message 104. Thus, transmitting a message 104 from the source host 103 to the destination host 103 may comprise switching by a first switch 105 from the source host's network 102 to an intermediate network 102, and by a second switch 105 from the intermediate network 102 to the destination host's network 102.

In a preferred embodiment, each message 104 may comprise one or more packets 106, each of which may be formatted ("encapsulated") in a header 107 specified by a protocol used on the network 102 on which that packet 106 is transmitted. The header 107 may also comprise information about the packet 106, such as an address of a destination host 103, a packet length, a checksum, or other data considered appropriate by the designers of that protocol, generally in a predetermined order.

The switch 105 may receive every packet 106 transmitted on the first network 102, and recognize which packets 106 to retransmit to the second network 102. The switch 105 may similarly switch from the second network 102 to the first network 102. To recognize which packets 106 to retransmit, the switch 105 may examine the headers 107 and identify a destination address or other routing information. To identify this routing information, the switch 105 may generally examine the packets 106 and identify a header 107, and within the header 107 identify routing information in a location specified by the protocol for that packet 106.

Because packets are commonly switched based on eight bit bytes, the term "word" used herein generally refers to an eight bit byte, unless otherwise specified. However, those skilled in the art would recognize, after perusal of this application, that switching based on other data word sizes is within the scope and spirit of the invention.

Packet Switching Device

Figure 2:
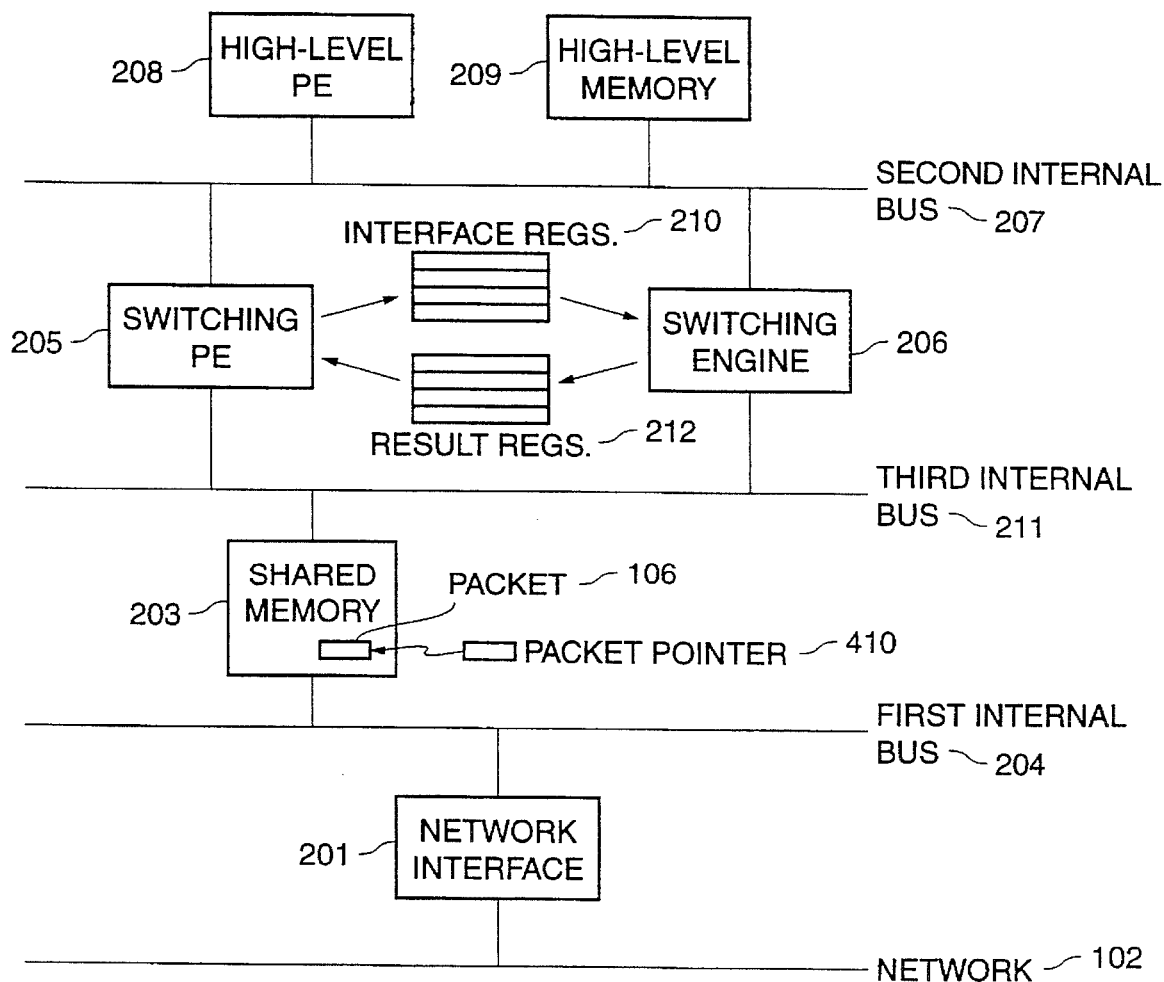
FIG. 2 shows a block diagram of a packet switch.

FIG. 2 shows a block diagram of a packet switch.

In a preferred embodiment, a switch 105 may comprise a network interface 201, such as Ethernet interface, FDDI interface, or Token Ring interface. The network interface 201 is coupled to the network 102 and performs low-level operations for each packet 106. Such low-level operations may comprise reading a packet 106 into a shared memory 203, and computing a checksum for the packet 106. More than one network 102 will be coupled to the switch 105, but there may be only a single network interface 201 coupled to all of those networks 102.

The switch 105 may also comprise a first internal bus 204, coupled to each network interface 201. In a preferred embodiment, the first internal bus 204 may comprise a "Cisco bus" or "CX bus" both available from Cisco Systems, Inc of Menlo Park, Calif. as part of one or more of its products. The first internal bus 204 may be coupled to a shared memory 203.

The shared memory 203 may be coupled, by means of a third internal bus 211, to a switching processor 205 and a switching engine 206, described in more detail with reference to FIG. 3. The switching processor 205 may also be coupled to the switching engine 206 by means of a set of interface registers 210 and a set of result registers 212.

The switching processor 205 and switching engine 206 may also be coupled to a second internal bus 207, which may be coupled to a high-level processor 208 and a high-level memory 209. In a preferred embodiment, the high-level processor 208 may comprise a Motorola "68000" series processor operating at 25 MHz (available from Motorola Corporation of Chicago, Ill.) and the second internal bus 207 may comprise a "Multibus" bus (available from Intel Corporation of Santa Clara, Calif.). In a preferred embodiment, the memory 209 may comprise at least about 16 MB of memory. Although a preferred embodiment generally does not require mass storage for storing packets 106, the high-level processor 208 may comprise mass storage for other purposes, such as storing code upgrades, logging data, utility programs, or other known purposes.

In a preferred embodiment, each network interface 201 may receive packets 106 from the network 102 it is coupled to. The switching processor 205 may identify packets 106 addressed to the switch 105 itself and may forward information from those packets 106 to the high-level processor 208. Information from those packets 106 may comprise routing information from hosts 103 or other switches 105 regarding the state of the network 102, such as traffic on designated network links or quality of communication to designated other networks 102 or hosts 103. The high-level processor 208 may record routing information in a routing table in the high-level memory 209. Routing tables, and recording routing information in routing tables, are known in the art.

In a preferred embodiment, the switching processor 205 may also collect statistical information about packets 106, and forward that information to the high-level processor 208. For example, in a preferred embodiment the switching processor 205 may count the number of packets 106 transmitted on the network 102 and forward that information to the high-level processor 208 upon the latter's request. In a preferred embodiment, the high-level processor 208 may request the data periodically from the switching processor 205, e.g., every ten seconds.

In a preferred embodiment, the switching processor 205 and the switching engine 206 may operate to examine packets 106 and identify protocol patterns in headers 107. The switching processor 205 and switching engine 206 may be capable of quick operation, and may be capable of requesting the high-level processor 208 to switch a packet 106 if that packet 106 requires more complex processing, such as fragmentation. Fragmentation is known in the art.

Packet Switching Engine

Figure 3:
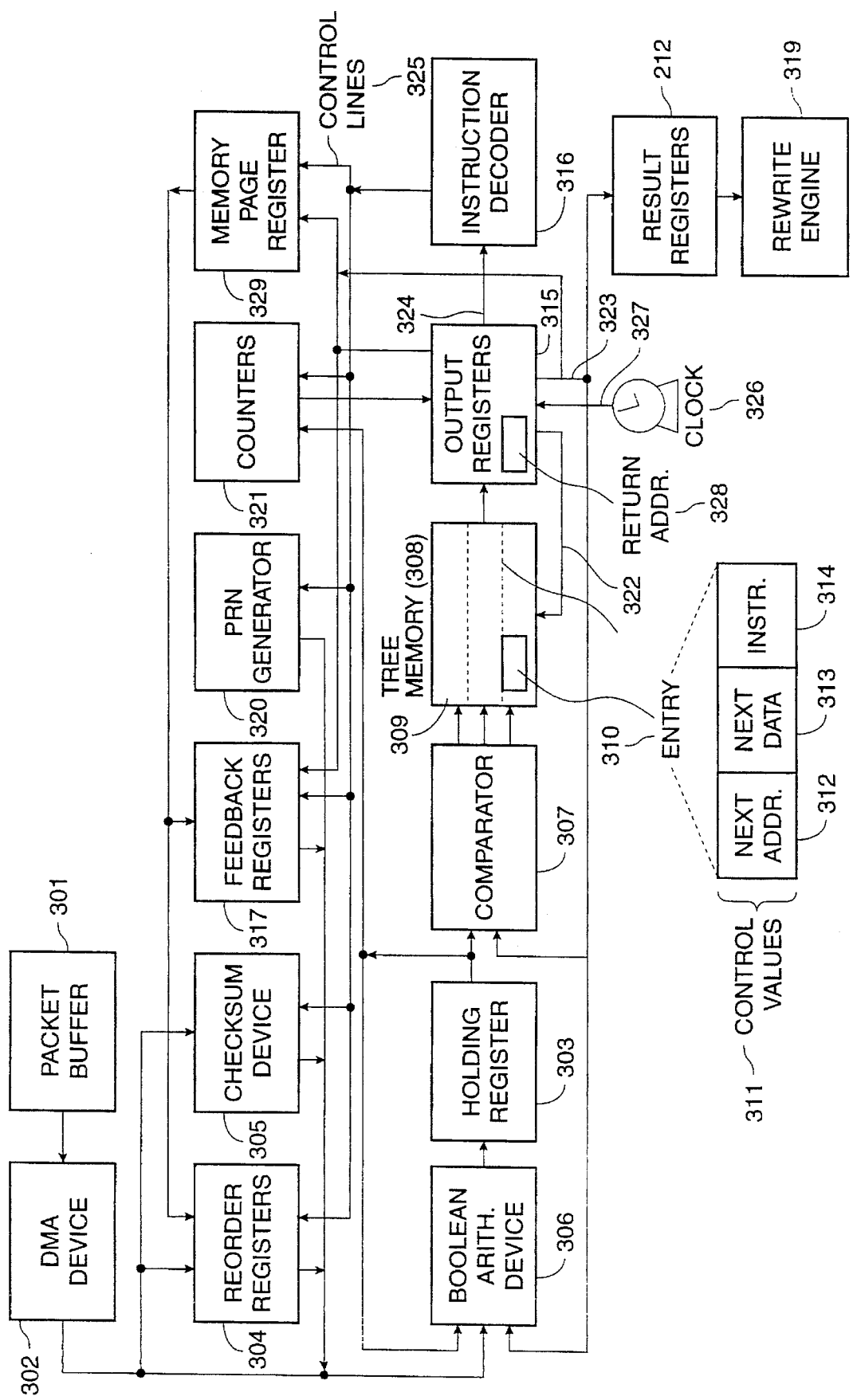
FIG. 3 shows a block diagram of a packet switching engine.

FIG. 3 shows a block diagram of a packet switching engine.

In a preferred embodiment, a packet 106 to be switched may be held in a packet buffer 301 in the shared memory 203 for review by the switching engine 206. The packet buffer 301 may be coupled to a DMA device 302, which may transfer words from the packet buffer 301 to one or more of the following: a boolean arithmetic device 306, a set of reorder registers 304, or a checksum device 305, in response to a set of control signals 325 from an instruction decoder 316.

In a preferred embodiment, the first input of the boolean arithmetic device 306 may be coupled to the reorder registers 304, the checksum device 305, a set of feedback registers 317, a pseudorandom number generator 320, and the DMA device 302. The second input of the boolean arithmetic device 306 may be coupled to a next data field 313. The boolean arithmetic device 306 may have an output coupled to a holding register 303. The output of the holding register 303 may be coupled to a third input of the boolean arithmetic device 306. The boolean arithmetic device 306 may select two of its three inputs, under control of control lines 325, and perform a boolean operation on them. The boolean operation to be performed may be any one of the boolean operations known in the art, such as but not limited to AND, XOR, and IDENTITY. The IDENTITY function would cause data to pass through the boolean arithmetic device 306 unaltered, allowing direct loading of data into the holding register 303.

The output of the holding register 303 may be coupled to an input of a comparator 307. The comparator 307 may also receive a second input comprising a data value for comparison; it may determine a set of comparison results and present those results at a set of outputs. In a preferred embodiment, the comparator may determine whether its first input is less than, equal to, or greater than the data value for comparison, and the outputs may correspond exactly to whether the less than ("<"), equal to ("="), or greater than (">") comparisons are true. However, in an alternative embodiment, the comparator 307 could generate an address or a part of an address in response to its inputs.

The outputs of the comparator 307 may be coupled to a decision tree memory 308, herein a "tree memory". In a preferred embodiment, the tree memory 308 may comprise a set of three addressable memories 309, each selected by one output of the comparator 307. Thus, one addressable memory 309 may be enabled by the "<" output, one by the "=" output, and one by the ">" output.

The tree memory 308 may also receive a second input comprising an address for indicating a memory location in each addressable memory 309 for the tree memory 308. Thus, the outputs of the comparator 307 and the second input of the tree memory 308 may collectively indicate an entry 310 in the tree memory 308. Each entry 310 may comprise a set of control values 311 for control of the switching engine. In a preferred embodiment, the control values 311 may comprise a next address 312 for the tree memory 308, a next data value 313 for comparison, and an instruction 314. The tree memory 308 may present the control values 311 at an output.

The output of the tree memory 308 may be coupled to a set of output registers 315. In a preferred embodiment, the set of output registers 315 may comprise at least four sets of registers, that may be configured in a 2-deep or 4-deep pipeline. Pipelined registers are known in the art.

The output registers 315 may in turn be coupled to a set of control lines 322 (16 bits wide in a preferred embodiment), 323 (8 bits wide in a preferred embodiment), and 324 (8 bits wide in a preferred embodiment), that may couple the control values 311 (the next address 312, next data word 313, and instruction 314, respectively) to other circuits. The next address 312 may be coupled to the tree memory 308. The instruction 314 may be coupled to an instruction decoder 316. The next data word 313 may be coupled to the result registers 212 (FIG. 2), the boolean arithmetic device 306, the comparator 307, and a set of feedback registers 317.

In a preferred embodiment, the output registers 315 may also comprise a return address register 328 indicating a location in the tree memory 308. The return address register 328 may be set by a CALL instruction 314 to the current location before execution of a subroutine. The return address register 328 may be used by a RETURN instruction 314, or by a forced return operation, described herein, to indicate the location to return to after the subroutine is terminated or interrupted.

In a preferred embodiment, the output registers 315 may comprise circuits for ensuring that feedback between inputs to the tree memory 308 and output from the tree memory 308 are well defined. Such circuits are known in the art. The output registers 315 may be coupled to a clock circuit 326 and a set of clock control lines 327.

The next address 312 may be coupled to the second input of the tree memory 308, and may comprise an address for indicating a memory location in each addressable memory 309 for the tree memory 308, for a next instruction cycle. Alternatively, when performing a RETURN instruction 314 or a forced return operation, the return address register 328 may be coupled to the tree memory 308 and the ">" output of the comparator 307 is forced to be enabled. In a preferred embodiment, the next address 312 may comprise a 16-bit value.

The next data value 313 may be coupled to the first input of the boolean arithmetic device 306, and may comprise a set of mask bits for a boolean operation, for a next instruction cycle. In a preferred embodiment, the tree memory 308 may direct, by means of an instruction 314, that the next data value 313 may be used as a set of mask bits. However, in a preferred embodiment, data words from the packet 106 may generally be used without masking; i.e., the selected boolean operation is generally IDENTITY. The next data value 313 may also be coupled to the second input of the comparator 307, and may comprise a data value for comparison, for a next instruction cycle. In a preferred embodiment, the next data value 313 may comprise an 8-bit value.

The instruction 314 may be coupled to an instruction decoder 316, which may decode and execute the instruction 314. In a preferred embodiment, the instruction decoder 316 may comprise an ASIC, a PAL, or a similar device, such as the FPGA XC4000 device (available from Xilinx Corporation of San Jose, Calif.). The instruction decoder 316 may output a set of control signals (not shown) for controlling registers and devices. Registers to be controlled may comprise the result registers 212, holding register 303, reorder registers 304, checksum device 305, boolean arithmetic device 306, output registers 315, as well as the feedback registers 317, a pseudorandom number generator 320, and a set of counter registers 321. In a preferred embodiment, the instruction 314 may comprise an 8-bit value.

The tree memory 308 may operate in cooperation with other circuits to comprise a finite state machine that matches packets 106 using a branching decision tree. Each address of the tree memory 308 may represent a state of the finite state machine, at which a data word of the header 107 may be compared with a known data value, one or more actions taken in response to the comparison, and a next state selected in response to the comparison. Additional state for the finite state machine may be defined by the feedback registers 317, as described herein.

In a preferred embodiment, data words from the packet 106 may be held, by means of an instruction 314, in a set of reorder registers 304, and may be coupled to the first input of the boolean arithmetic device 306. Although in a preferred embodiment data words from the packet 106 may be examined sequentially in the order in which they appear in the header 107, they may also be examined out of order. In such case, the tree memory 308 may direct, by means of an instruction 314, that a data word from one of the reorder registers may be used for a next instruction cycle, instead of a data word from the holding register 303.

Data words from the packet 106 may also be accumulated and a checksum held in the checksum device 305. The checksum device 305 may simultaneously compute checksums according to one or more protocol specifications. In a preferred embodiment, the checksum device 305 may simultaneously compute a checksum according to the IP protocol and a checksum according to the CLNP protocol.

In a preferred embodiment, the checksum device 305 may also compare the checksum it computes for each protocol against a known correct checksum. In response to a control line from the instruction decoder 316, the checksum device 305 may set result bits indicating whether the checksum is correct. These result bits may be coupled to the holding register 303, and may be used in the next tree memory operation, instead of data from the DMA device 302. In a preferred embodiment, bit 7 may be set to indicate that the IP protocol checksum is correct, and bit 6 may be set to indicate that the CLNP protocol checksum is correct. When the tree memory 308 determines that the packet 106 was sent according to the IP particular protocol, for example, it may test the IP checksum bit and ignore the CLNP checksum bit.

Data words may also be generated by the tree memory 308 and held, by means of an instruction 314, in a set of feedback registers 317. The tree memory 308 may direct, by means of an instruction 314, that a data word from the feedback registers 317 may be loaded into the holding register 303, for use in the next tree memory operation, instead of data from the DMA device 302. As shown herein, the feedback registers 317 may be used to store partial results by one part of the method for making a switching decision for the packet 106 for use by a later part of that method.

In a preferred embodiment, the reorder registers 304 and the feedback registers 317 may comprise addressable locations in a common memory. For example, there may be 16 reorder registers 304 and 16 feedback registers 317. A memory page register 329 may comprise one bit for selecting either one of the 16 reorder registers 304 or one of the 16 feedback registers 317 as a data source for a load operation. The memory page register 329 may also select one of several additional sets of 16 addressable locations. In a preferred embodiment, the memory page register 329 may be loaded by means of an instruction 314.

A pseudorandom number generator 320 may also be coupled to the first input of the boolean arithmetic device 306. In a preferred embodiment, the pseudorandom number generator 320 may be implemented as a free running counter, with its bits reversed from normal. Free running counters advance at each instruction cycle and are known in the art. The tree memory 308 may direct, by means of an instruction 314, that a data word (i.e., a pseudorandom number) from the pseudorandom number generator 320 may be loaded into the holding register 303 for use on the next instruction cycle. A set of pseudorandom numbers generated by the pseudorandom number generator 320 may be used in load sharing for certain protocols, such as DECNET.

A set of counters 321 may also be coupled to the second input of the output registers 315. In a preferred embodiment, there may be two counters 321, each of which may be loaded with the contents of the holding register 303. For example, a length value for a variable length header field, such as that found in source route bridging, may be loaded into the holding register 303 and subsequently loaded into a counter 321 by means of an instruction 314. Each counter 321 may be set to increment or decrement (although in a preferred embodiment, counters 321 may only be set to decrement) each time a data word of the packet 106 is read. Each counter 321 may also be set to increment or decrement (although in a preferred embodiment, counters 321 may only be set to decrement) by means of an instruction 314.

Upon either counter 321 reaching zero, the output registers 314 may perform a forced return, by coupling a saved location from the return address register 328 to the address inputs of the tree memory 308. For example, the tree memory 308 may load a first counter 321 with a data value from the holding register 303, set that counter 321 to decrement, and perform a CALL instruction 314. Each succeeding data word read from the packet 106 into the holding register 303 causes the counter 321 to decrement. Upon reaching zero, the counter 321 causes the output registers 315 to perform a forced return, by coupling the address in the return address register 328 to the address inputs of the tree memory 308 and forcing the ">" output of the comparator 307 to be enabled.

Data words may be generated by the tree memory 308 and held, by means of an instruction 314, the result registers 212 (FIG. 2). The result registers 212 may be used for communication with the switching processor 205, such as to indicate an output network interface 201 for the packet 106 and a protocol type for the packet 106. These results allow the switching processor 205 to determine, for example, if the packet 106 may be directly output, or must be revised before output, to a selected network interface 201.

The result registers 212 may also be coupled to a rewrite engine 319, which may alter the packet 106 in response to data values stored therein, and may generate a signal indicating when it has finished.

Operation of Packet Switching Device

Figure 4:
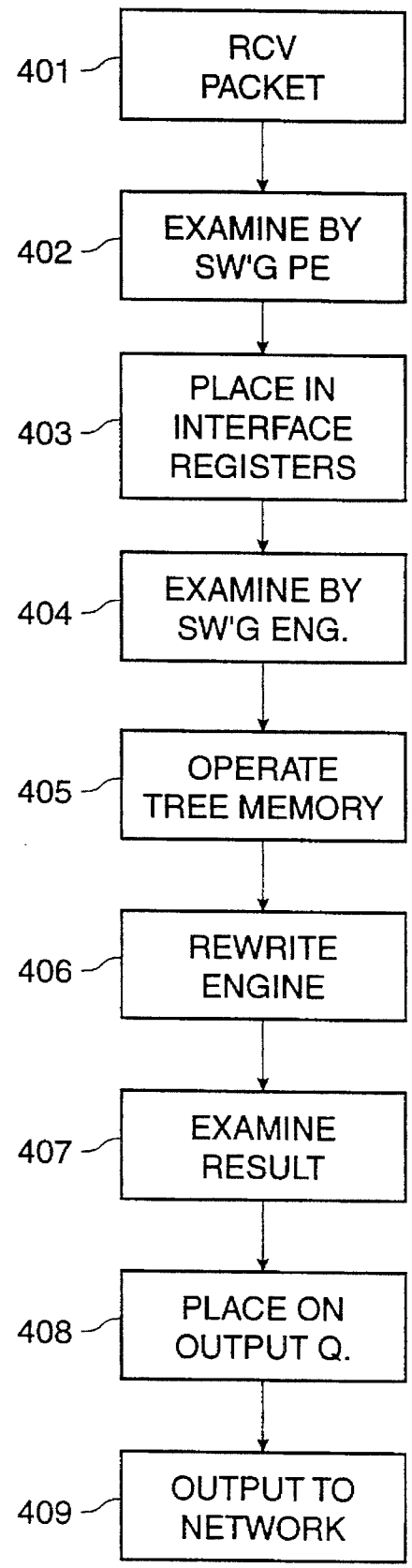
FIG. 4 shows a flow diagram of operation of a switching processor and switching engine.

FIG. 4 shows a flow diagram of operation of a switching processor and switching engine.

In a preferred embodiment, operation of the switching processor 205 and the switching engine 206, along with other circuits including the network interfaces 201 and the high-level processor 208, may proceed essentially asynchronously. Asynchronous processes are known in the art, so a detailed description of signaling between such devices is not given except where particular to the invention. Those skilled in the art would recognize, after perusal of this application, that such description is not necessary for understanding how to make or use the invention.

At a step 401, a packet 106 may be received from the network 102. A network interface 201 coupled to the network 102 may move the packet 106 into the shared memory 203 by means of the first internal bus 204. In a preferred embodiment, the shared memory 203 may comprise an input queue; a pointer to the packet 106 may be generated and appended to that queue.

At a step 402, the switching processor 205 may examine the packet 106 in the shared memory 203 by means of the third internal bus 211. In a preferred embodiment, the switching processor may examine the interface memory's input queue, may remove the first element from that queue, and may examine the packet 106 pointed to by that first element.

At a step 403, the switching processor 205 may place a pointer to the packet 106 into the interface registers 210. In a preferred embodiment, the shared memory 203 may comprise one or more buffer areas; the switching processor 205 may move the packet 106 into a buffer area with an area of free memory preceding the header 107, and may generate a packet pointer 410 to point to the first word of the packet 106.

At a step 404, the switching engine 206 may examine the interface registers 210 and retrieve the packet pointer 410 to the packet 106.

At a step 405, the switching engine 206 may operate under control of the tree memory 308. The switching engine 206 may examine the packet 106 and may place a set of results in the result registers 212.

At a step 406, the rewrite engine 319 may alter the packet 106 in response to data values stored therein, and may generate a signal for indicating when it has finished.

At a step 407 (concurrent with step 406), the switching processor 205 may examine the result registers 212. In a preferred embodiment, the switching processor 205 may determine to which network 102 the packet 106 should be routed, and may adjust the packet's header checksum, hop count, packet length, "time to live", and other parameters. The switching processor 205 may also wait for the signal indicating that step 406 is complete before control proceeds to step 408.

At a step 408, the switching processor 205 may append the packet 106 to an output queue in the shared memory 203. In a preferred embodiment, the shared memory 203 may comprise one or more output queues for each network interface 201, and the selection of which output queue onto which the packet 206 is placed may be in response to data in the result registers 212.

At a step 409, a network interface 201 (possibly different from the network interface 201 that received the packet 106) may output the packet 106 to a network 102 (possibly different from the network 102 from which the packet 106 was received). In a preferred embodiment, the network interface 201 may remove the first element from the output queue, and may output the packet 106 pointed to by that first element.

Operation of Packet Switching Engine

Figure 5A:
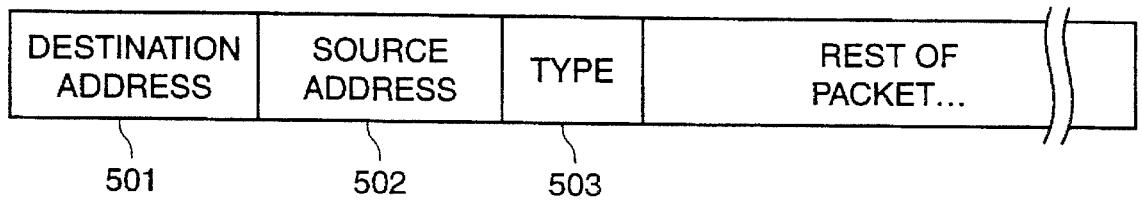
FIG. 5A shows an example format for a packet.
Figure 5B:
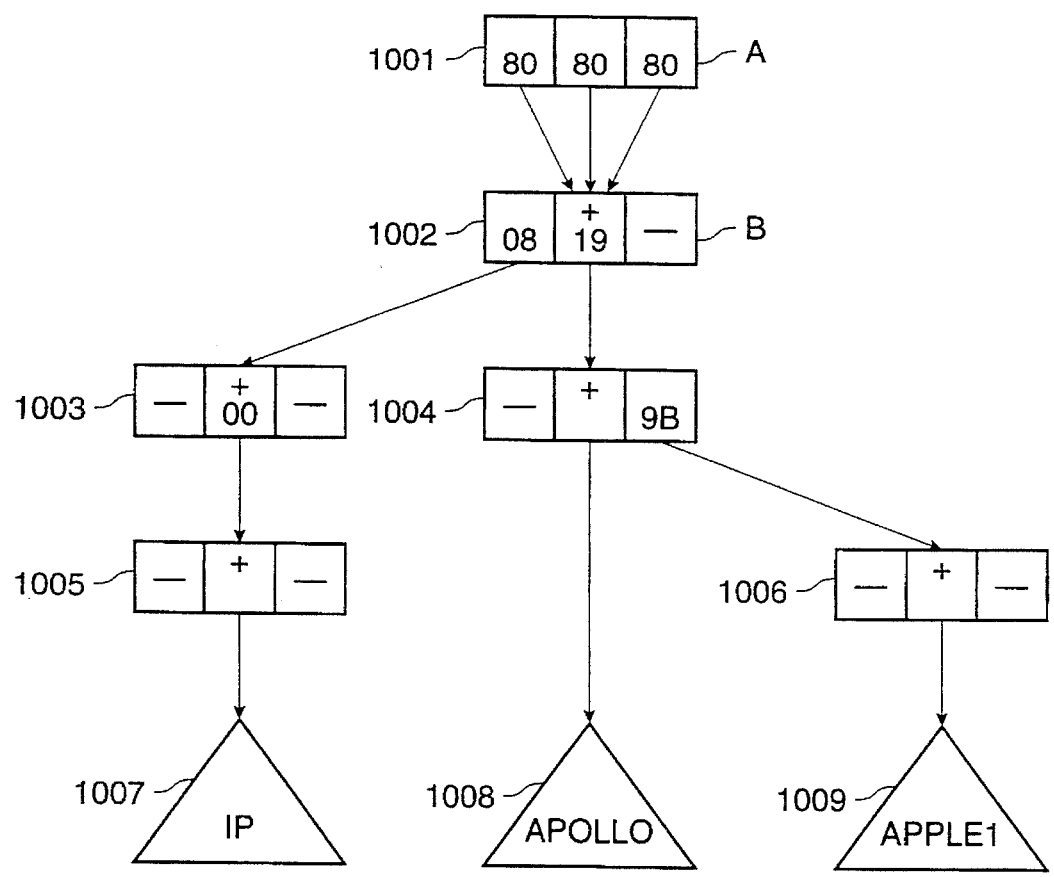
FIG. 5B shows an example section of the tree memory, for an example of operation of a switching engine.

FIG. 5A shows an example format for a packet, and FIG. 5B shows an example section of the tree memory, for an example of operation of a switching engine.

In this example, each expected packet type has a protocol format as shown in table 5-1 herein. As shown in the table, more than one format may be valid for certain protocols. The protocol format data may be used to prepare the tree memory 308 with a set of nodes, organized as a directed graph, for classifying the packet 106. However, for simplicity, only a subsection of the tree memory 308 is shown.

The tree memory 308 may be prepared ahead of time with a set of static values for representing the protocol format data. In response to protocol format data, a program may generate a set of values for insertion into the tree memory 308. Alternatively, as the protocol format data does not change rapidly, the protocol format data may be coded directly in a format for insertion into the tree memory.

In a preferred embodiment, the tree memory 308 may be initiated with a predetermined tree memory location A; the result of the last comparison remains undetermined. The tree memory 308 entry 310 for location A may therefore preferably comprise a NOP (no operation), as described herein, with all its branches pointing to a second predetermined location B. As all branches at location A point to location B, the tree memory 308 entry 310 at location B is sure to be executed second with a defined result of the last comparison. Location B is thus where normal execution begins.

In this example, the packet 106 may be received on an Ethernet network 102, where the packet's maximum length is 1526 (decimal) bytes. Thus in this example, the length field (shown in the table as two bytes denoted "len len") is always less than 06 00 hexadecimal. As the minimum fixed value specified by any protocol format is 06 00 (hexadecimal), there should be no packets 106 which could be valid under more than one format.

TABLE 5-1

Packet Protocol Format.

| Packet Type | Encapsulation Data | | | | | | | | |
|---|---|---|---|---|---|---|---|---|---|
| IP        | 08  | 00  |    |    |    |    |    |    |    |
| IP        | len | len | AA | AA | 03 | 00 | 00 | 00 | 08 00 |
| IP        | len | len | 06 | 06 | 03 |    |    |    |    |
| CLNP      | len | len | FE | FE | 03 |    |    |    |    |
| ARP       | 08  | 06  |    |    |    |    |    |    |    |
| Apollo    | 80  | 19  |    |    |    |    |    |    |    |
| Appletalk1| 80  | 9B  |    |    |    |    |    |    |    |
| Novell    | 81  | 37  |    |    |    |    |    |    |    |
| XNS       | 06  | 00  |    |    |    |    |    |    |    |
| XNS       | len | len | AA | AA | 03 | 00 | 00 | 00 | 06 00 |
| Decnet4   | 60  | 03  |    |    |    |    |    |    |    |
| Decnet4   | len | len | AA | AA | 03 | 00 | 00 | 00 | 60 03 |
| Appletalk2| len | len | AA | AA | 03 | 08 | 00 | 07 | 80 9B |
| Vines     | 0B  | AD  |    |    |    |    |    |    |    |
| Vines     | len | len | AA | AA | 03 | 08 | 00 | 4A | 80 34 |

In this example, each data word of the packet 106 is an eight bit byte, expressed as two hexadecimal digits. Thus for example, 03 represents the bit pattern 0000 0011.

In this example, each location of the tree memory 308 has three values, separated by dots, each of which comprises a next address 312 pointing to the next node, an eight bit byte for the next data value 313 for comparison, and an instruction 314. The next address 312 is represented by an arrow pointing to a next location. The representation of an instruction 314 may include a "+" symbol to indicate that the instruction 314 directs the packet pointer 410 to advance (i.e., the instruction bit for that action is set). Thus for example, [80.+00.--] would represent three values, 80, +00 and --. The first, 80, indicates next comparing with hexadecimal 80; the second, +00, indicates advancing the packet pointer 410 and next comparing with 00; the third, --, indicates a no-operation (i.e., do nothing).

In this example, a no-operation is indicated to show that the type of the packet 106 has been recognized, or determined to be of a type that is not known. In practice, when the type of the packet 106 has been recognized, the "--" would be replaced with the next instruction 314 in a subsection of the tree memory 308 for processing that type of packet 106. When the type of the packet 106 has been determined to be one that is not known, the tree memory 308 would move on to process the next packet 106.

An instruction 314 "+" indicates advancing the packet's pointer and no further operation. In practice, the "+" would similarly be replaced with the next instruction 314 in a subsection of the tree memory 308 for processing that type of packet 106, with the instruction bit set for advancing the packet pointer 410.

In this example, the packet buffer 301 holds a packet 106 transmitted on an Ethernet network 102. After a destination address 501 and a source address 502, the packet may comprise a type field 503, followed by the remainder of the packet 106. The type field 503 may comprise a 16-bit type value, or it may comprise a length.

In a preferred embodiment, the tree memory 308 may comprise subsections for parsing and recognizing the destination address 501 and the source address 502. After parsing and recognizing the destination address 501 and the source address 502, the tree memory 308 may parse and recognize the type field 503. This example shows parsing and recognition of the IP, Apollo, and Appletalk1 type fields 503.

| Type Field | Encapsulation Data | |
|---|---|---|
| IP | 08 | 00 |
| Apollo | 80 | 19 |
| Appletalk1 | 80 | 9B |

In a first subexample, the packet 106 is an IP packet. After the destination address 501 and the source address 502 the packet 106 has the following data:

08 00<IP information>

In this first subexample, the 08 00 identifies the packet 106 as an IP packet. The packet pointer 410 will start out pointing at the 08 byte in the packet 106; the tree memory 308 will start out at a top node 1001, which is [80.80.80]. In practice, the comparison result would be defined by an outcome of a comparison step from a previous operation, such as parsing the source address. However, in this example, the comparison result is said to be initially undefined, but is one of less than, equal to, or greater than.

At node 1001, the comparator 307 compares the packet's byte 08 with the data value 80, and the tree memory 308 continues with the next node 1002, which is [08.+19.--]. The comparison result is "<", because 08 <80.

At node 1002, the comparator 307 compares the packet's byte 08 with the (less than) data value 08, and the tree memory 308 continues with the next node 1003, which is [--.+00.--]. The comparison result is "=" because 08 =08. The (equal to) selection of the next node 1003 is +00, advancing the packet pointer 410 so it will point to the next byte, i.e., the 00 byte.

At node 1003, the comparator 307 compares the packet's byte 00 with the (equal to) data value 00, and the tree memory 308 continues with the next node 1005, which is [--.+.--]. The comparison result is "=" because 00 =00. The next node 1007 begins parsing of the IP information.

In a second subexample, the packet 106 is an Appletalk1 packet. After the destination address 501 and the source address 502 the packet 106 has the following data:

80 9B <Appletalk1 information>

In this second subexample, the 80 9B identifies the packet 106 as an Appletalk1 packet. The packet pointer 410 will start out pointing at the 80 byte in the packet 106; the tree memory 308 will start out at a top node 1001, which is [80.80.80]. As noted for a previous example, the comparison result is said to be initially undefined, but is one of less than, equal to, or greater than.

At node 1001, the comparator 307 compares the packet's byte 80 with the data value 80, and the tree memory 308 continues with the next node 1002, which is [08.+19.--]. The comparison result is "=" because 80 =80. The (equal to) selection of the next node 1002 is +19, advancing the packet pointer 410 so it will point to the next byte, i.e., the 9B byte.

At node 1002, the comparator 307 compares the packet's byte 9B with the (equal to) data value 19, and the tree memory 308 continues with the next node 1004, which is [.+.9B]. The comparison result is ">", because 9B>19.

At node 1004, the comparator 307 compares the packet's byte 9B with the (greater than) data value 9B, and the tree memory 308 continues with the next node 1006, which is [--.+.--]. The comparison result is "=", because 9B=9B The next node 1007 begins parsing of the Appletalk1 information.

In a third subexample, the packet 106 is an unknown type of packet 106. After the destination address 501 and the source address 502 the packet 106 has the following data:

18 99<further information>

In this third subexample, the 18 99 does not identify the packet 106 as any known type. The packet pointer 410 will start out pointing at the 18 byte in the packet 106; the tree memory 308 will start out at a top node 1001, which is [80.80.80]. As noted for a previous example, the comparison result is said to be initially undefined, but is one of less than, equal to, or greater than.

At node 1001, the comparator 307 compares the packet's byte 18 with the data value 80, and the tree memory 308 continues with the next node 1002, which is [08.+19.--].

The comparison result is "<" because 18<80.

At node 1002, the comparator 307 compares the packet's byte 18 with the (less than) data value 08, and the tree memory 308 continues with the next node 1003, which is [--.+00.--]. The comparison result is ">", because 18>08. The next node 1003 discards the packet 106 as being of an unknown type.

Figure 6A:
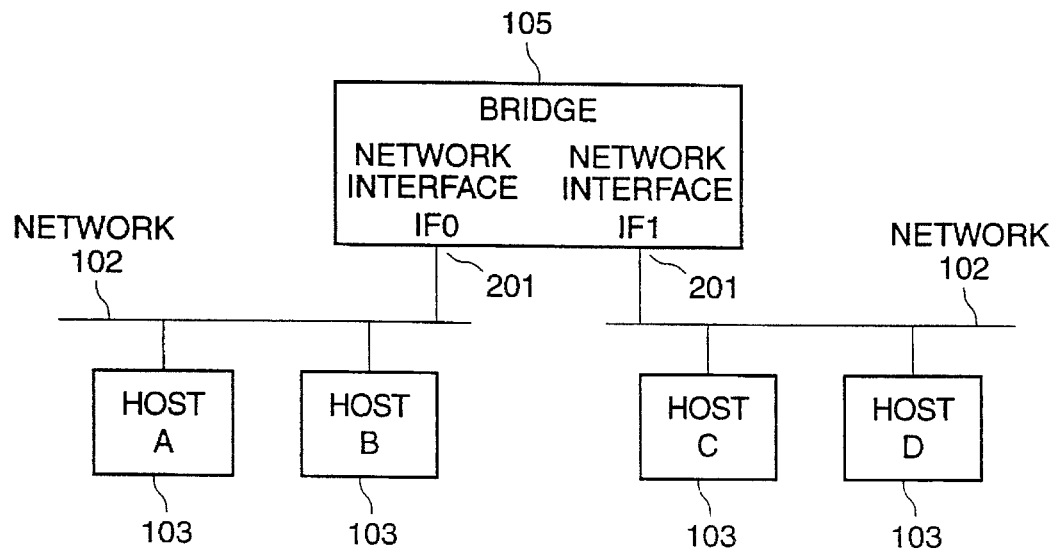
FIG. 6A shows an example network.
Figure 6B:
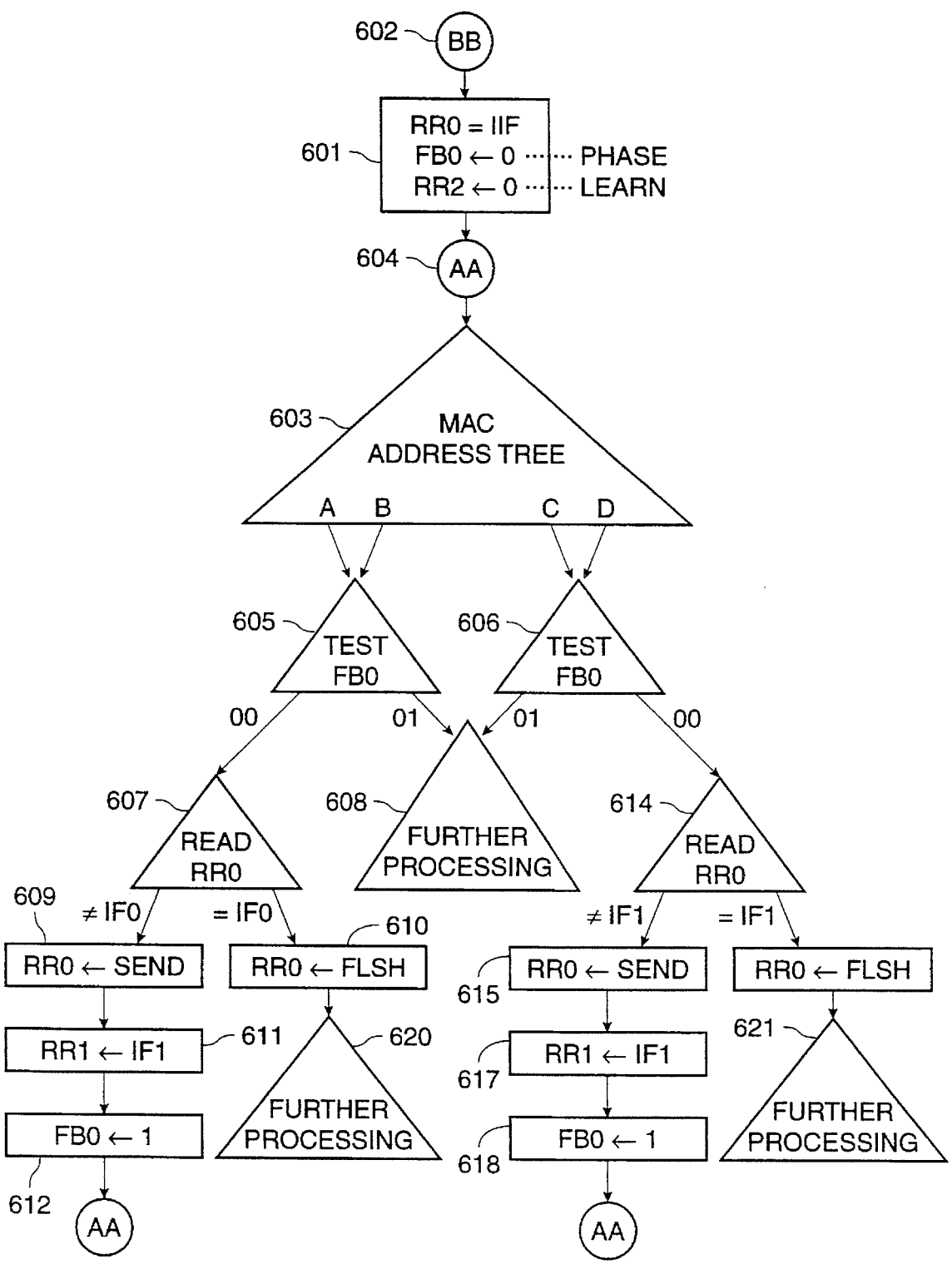
FIG. 6B shows an example section of the tree memory, for a further example of operation of a switching engine under control of a section of a tree memory, showing a bridging operation.

FIG. 6A shows an example network, and FIG. 6B shows an example section of the tree memory, for a further example of operation of a switching engine under control of a section of a tree memory, showing a bridging operation.

In this further example, the packet 106 may be addressed from any one of hosts 103 A, B, C, or D, on one of two networks 102, to any other one of those hosts 103. A switch 105 may perform bridging between these two networks 102, and may have a zeroth network interface 201 to a zeroth network 102 and a first network interface 201 to a first network 102. In this example, the switch 105 has already received packets 106 allowing it to determine the location of each of the hosts 103 in the figure. This is sometimes called "learning" an address; learning an address is known in the art.

If the switch 105 is performing both bridging and routing, in addition to matching addresses for bridging, it will match its own address in the destination address field, in case it is being asked to route the packet. Performing bridging and routing in the same switch 105 is known in the art.

A section of tree memory 308 may comprise a decision tree 601, entered at a location 602 BB, at which a new packet 106 is received and processed. In the first decision tree, a reorder register 304 R0 may be set to indicate a network interface 201 from which the packet 106 was received, a feedback register 317 F0 may be set to indicate a phase 0 for matching the destination address for the packet 106, and a result register 318 RR2 may be set to indicate no need to "learn" the source address of the packet 106.

The tree memory 308 proceeds to a decision tree 603, entered at a location 604 AA, at which a destination address or a source address in the packet 106 may be parsed and recognized. The processes of parsing and recognizing destination and source addresses are known in the art. Accordingly, those skilled in the art would recognize, after perusal of this application, how to construct a section of tree memory 308 for conducting such parsing. Four possible results, one for each possible host 103, are shown. Treatment of broadcast, multicast, or other types of packet 106 are left out of this example to keep it simple. Those skilled in the art will recognize, after perusal of this application, that treatment of broadcast, multicast, or other types of packet 106 would be workable, and are within the scope and spirit of the invention.

The tree memory 308 proceeds to a decision tree 605 for hosts 103 A or B (input from the zeroth network interface 201), or to a decision tree 606 for hosts 103 C or D (input from the first network interface 201).

At the decision tree 605, the tree memory 308 may test feedback register 317 F0, and may proceed to a decision tree 607 for a "0" (phase 0, matched the destination address), or to a decision tree 608 for a "1" (phase 1, matched the source address).

At the decision tree 607, the tree memory 308 may test reorder register 304 R0, and may proceed to a decision tree 609 for a "0" (the zeroth network interface 201), or to a decision tree 610 for a "1" (the first network interface 201).

At the decision tree 608, tree memory 308 may proceed to a following decision tree for parsing the protocol type, as described with reference to FIG. 5B.

At the decision tree 609, the tree memory 308 may set result register 318 RR0 to indicate that the packet 106 should be sent to its destination address. The tree memory 308 may then proceed with a further decision tree 611. At this point, the tree memory 308 has identified the packet 106 as having come from one network 102 and being destined for the other network 102; hence, it should be sent on to its destination. Since the destination is "A" or "B", the packet 106 should be sent on to the zeroth network interface 201.

At the decision tree 610, the tree memory 308 may set result register 318 RR0 to indicate that the packet 106 should be discarded. The tree memory 308 may then proceed with a further decision tree 620. At this point, the tree memory 308 has identified the packet 106 as having come from one network 102 and being destined for the same network 102; hence, it has already reached its destination via that network 102, and may proceed to a following decision tree for parsing the protocol type, as described with reference to FIG. 5B.

At the decision tree 611, the tree memory 308 may set the result register 318 RR1 to indicate that the packet 106 should be output on the zeroth network interface 201. The tree memory 308 may then proceed with a further decision tree 612.

At the decision tree 612, the tree memory 308 may set the feedback register 317 F0 to indicate a phase 1 for matched the source address for the packet 106, and may proceed to the decision tree 603, entered at a location 604 AA.

At the decision tree 606, the tree memory 308 may similarly test feedback register 317 F0, and may proceed to a decision tree 614 for a "0" (phase 0, matched the destination address), or to the decision tree 608 for a "1" (phase 1, matched the source address).

At the decision tree 614, the tree memory 308 may similarly test reorder register 304 R0, and may proceed to a decision tree 615 for a "0" (the zeroth network interface 201), or to a decision tree 616 for a "1" (the first network interface 201).

At the decision tree 615, the tree memory 308 may similarly set result register 318 RR0 to indicate that the packet 106 should be sent to its destination address. The tree memory 308 may then proceed with a further decision tree 617. At this point, the tree memory 308 has identified the packet 106 as having come from one network 102 and being destined for the other network 102; hence, it should be sent on to its destination.

At the decision tree 616, the tree memory 308 may similarly set result register 318 RR0 to indicate that the packet 106 should be discarded. The tree memory 308 may then proceed with a further decision tree 621. At this point, the tree memory 308 has identified the packet 106 as having come from one network 102 and being destined for the same network 102; hence, it has already reached its destination via that network 102, and may proceed to a following decision tree for parsing the protocol type, as described with reference to FIG. 5B.

At the decision tree 617, the tree memory 308 may similarly set result register 318 RR1 to indicate that the packet 106 should be output on the first network interface 201. The tree memory 308 may then proceed with a further decision tree 618.

Recognition of Other Packet Information

In a preferred embodiment, the switch 105 may recognize other packet information and use that information for switching. Two examples are illustrative:

The packet 106 may comprise information that tells the switch 105 how to route the packet; this is sometimes called "source route bridging". Thus for example, the source host 103 may determine onto which networks 102 the packet 106 must be switched, and in what order, and may provide that information in a routing information field in the packet 106. The switch 105 must generally determine if the routing information field in the packet 106 indicates that the packet 106 should be switched between two networks 102 the switch 105 is coupled to. If so, the switch 105 should retransmit the packet 106 from one network 102 to the other network 102, but if not, the switch 105 should generally ignore the packet 106.

Figure 7A:
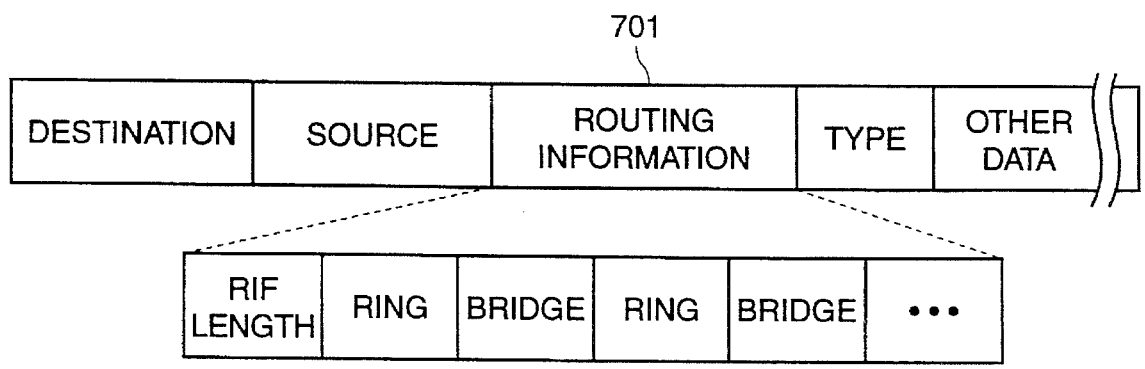
FIG. 7A shows an example format for a packet.
Figures 7B, 7C:
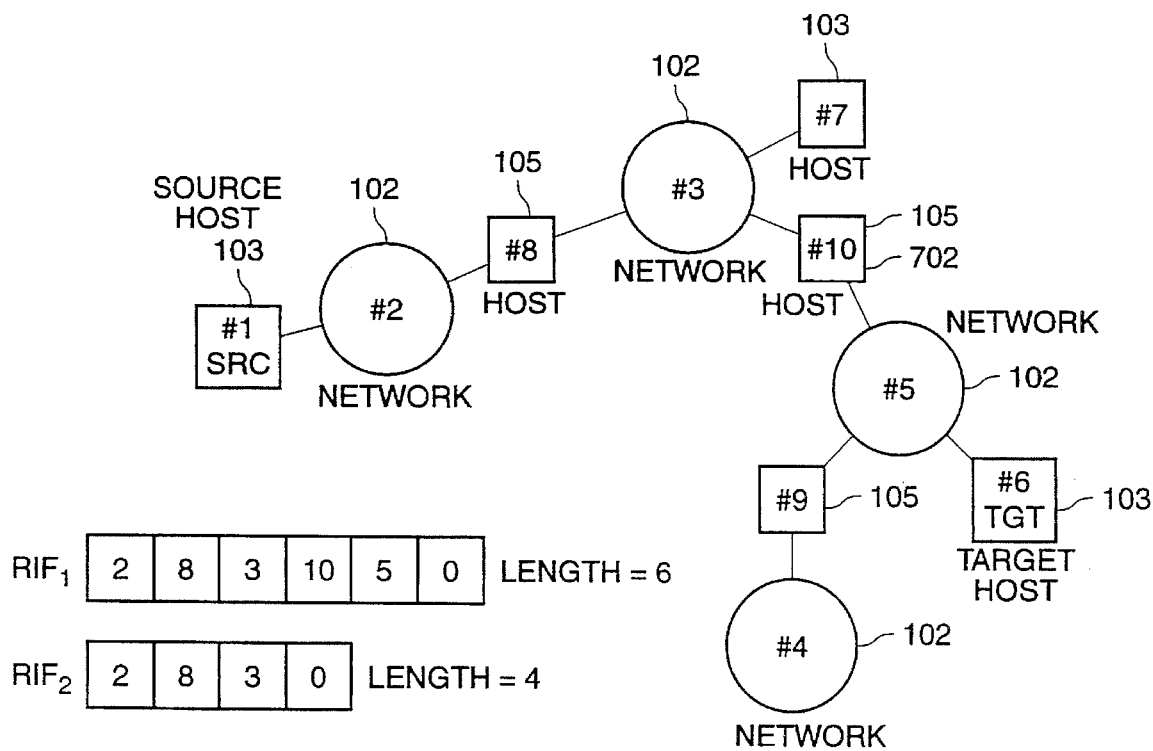
FIG. 7B shows an example network, for an example of source route bridging.
FIG. 7C shows first and second example access control lists.

FIG. 7A shows an example format for a packet, and FIG. 7B shows an example network, for an example of source route bridging.

In this example, the packet 106 comprises a routing information field 701 (RIF), that comprises a length value and a sequence of networks 102 and switches 105 forming a route from the source host 103 to the destination host 103. A value for the final switch 105 in the RIF 701 may be zero to indicate that the packet 106 may at that point be delivered to its destination host 103. In a preferred embodiment, the RIF 701 may also comprise other values that are known in the art, but are not described here because they are not necessary for an understanding of the invention.

One particular switch 702 will serve for this example. As each switch 105 knows which networks 102 it is coupled to, and which switch 105 it is, the example switch 702 knows which networks 102 for which it should route packets 106. When a packet 106 comprising a RIF 701 is recognized by the switch 702, it parses the RIF 701 and looks for a route that includes two networks 102 to which it is coupled and its own switch number.

In a first subexample, the packet 106 comprises a RIF 701, and the RIF 701 comprises a pair of networks 102 and the switch number for the example switch 702; the pair of networks 102 are coupled to the example switch 702. Accordingly, the switch 702 recognizes the packet 106 and switches it from a first network 102 in the RIF 701, parsed as above, to the next network 102 in the RIF 701.

In a second subexample, the packet 106 comprises a RIF 701, but the RIF 701 does not comprise a pair of networks 102 for which the example switch 702 should route packets 106. Accordingly, the switch 702 simply discards the packet 106.

In a preferred embodiment, the switch 105 may load the length value found in the RIF 701 into a counter 321, and decrement the counter 321 repeatedly while reading data words from the packet 106. When the counter 321 reaches zero, a forced return operation will occur, and the tree memory 308 will be found in a state where the entire RIF 701 has been processed, but no pair of networks 102 for which the switch 105 should route packets 106 has been found. Accordingly, the switch 105 will simply discard the packet 106.

Another example shows parsing of access control lists.

The switch 105 may be provided with an access control list that tells the switch 105 which devices are allowed to transmit messages to destinations on particular networks. Thus for example, a designated network may prohibit some or all of its hosts 103 from transmitting to destination hosts 103 on other networks 102, or may prohibit some or all hosts 103 on other networks 102 from transmitting to destination hosts 103 on that network 102. The switch 105 may be provided with an access control list that tells it which source addresses (or destination addresses, or combinations of source and destination addresses) are allowed. The switch 105 must generally determine if the destination address for each packet 106 is allowed. If so, the switch 105 should process the packet 106 normally (possibly switching it), but if not, the switch 105 should generally prohibit the packet 106 from reaching its designated destination, typically by refusing to switch it.

FIG. 7C shows first and second example access control lists.

An access control list 751 may comprise an identifier 752, a set of permissions 753 (which may explicitly permit access, explicitly deny access, or limit access to particular protocols), and a set of host addresses 754 (which may be source host addresses or destination host addresses). As with switching packets 106 in response to destination host addresses, the switch 105 may permit, deny, or limit access in response to an active access control list and in response to the source and destination host addresses in a packet 106.

In a preferred embodiment, the switching engine 206 may parse the packet 106 and recognize the destination host address and the source host address. In addition to determining to which output network interface 201 the packet 106 should be switched, the switching engine 206 may also determine (in response to an active access control list) whether switching the packet 106 would violate access control. If so, the switch 105 may take appropriate action, such as discarding the packet or issuing a warning message.

In a preferred embodiment, active access control lists may be converted by the high-level processor 208 from the high-level memory 209 into the tree memory 308 similarly to routing tables.

Tree Program Generator

Figure 8:
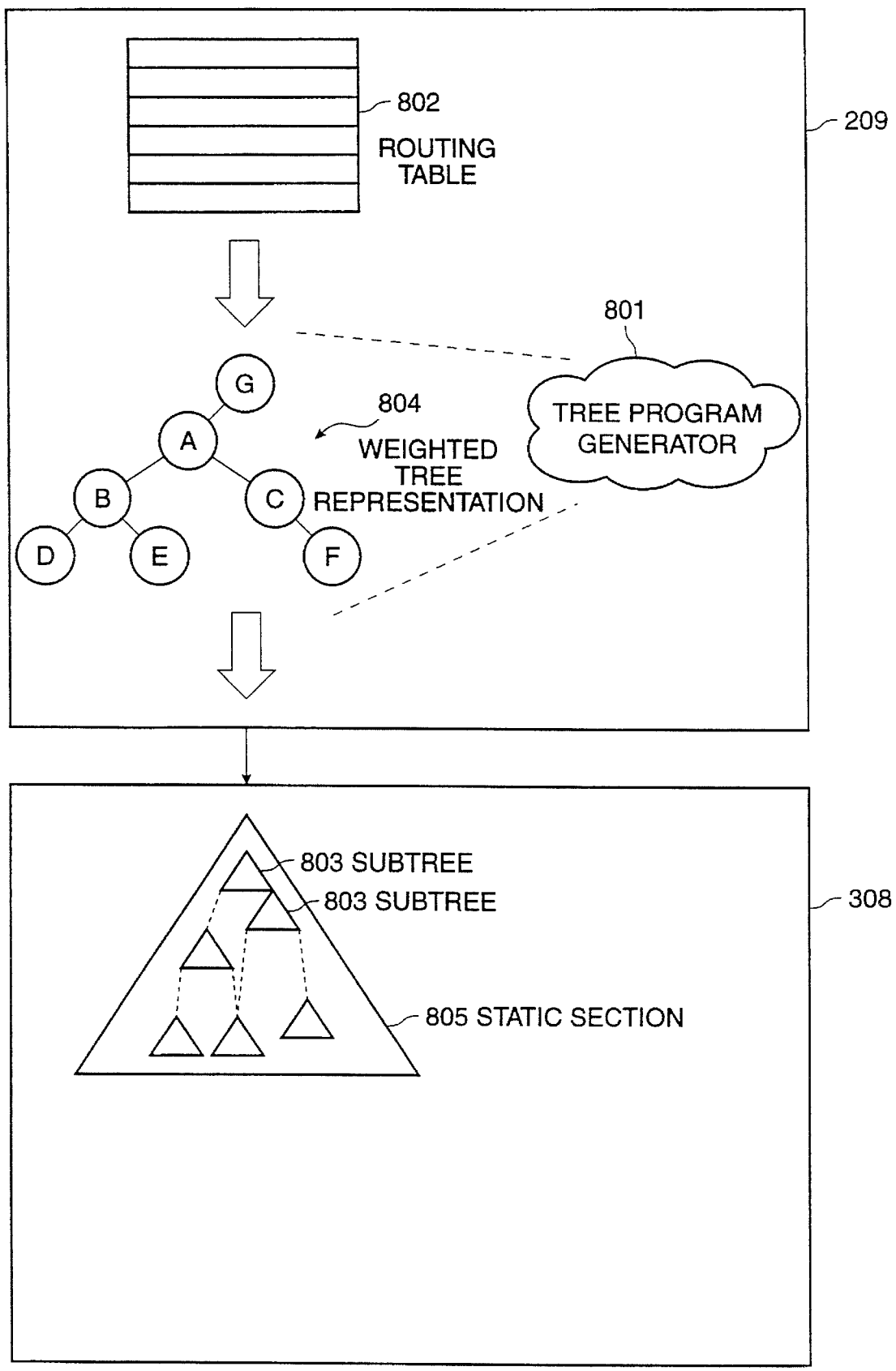
FIG. 8 shows a block diagram of data structures used in a tree program generator.

FIG. 8 shows a block diagram of data structures used in a tree program generator.

As noted herein, the high-level processor 208 may comprise a tree program generator 801 for converting information from a routing table 802 in high-level memory 209 into functional subsections ("subtrees") 803 in the tree memory 308, each of which may parse and recognize a portion of each packet 106. The tree program generator 801 may reside in high-level memory 209 and may be executed by the high-level processor 209.

In a preferred embodiment, the high-level processor 208 may comprise a set of console commands, to be entered by an operator at an input device coupled thereto. The console commands may be interpreted by the high-level processor 208 and may comprise commands for initializing the routing tables, forcing recomputation of the routing tables, displaying information about the switch 105, and placing tree memory programs into the tree memory 308.

In a preferred embodiment, the tree memory 308 may comprise a static section 805 and a dynamic section. The static section 805 may comprise information relating to classification of packets 106 by protocol, and may be assembled into the tree memory 308 in response to known information about protocol formats. The dynamic section may comprise information relating to routing and other information (such as access control) about the networks 102 to which the switch 105 is coupled, and may be dynamically generated and placed into the tree memory 308 in response to network information the switch 105 gleans from the network 102.

The high-level processor 208 may prepare a routing table in the high-level memory 209, in response to network information the switch 105 gleans from the network 102. In a preferred embodiment, the high-level processor 208 may prepare instructions for the tree memory 308 (i.e., it may prepare data for loading into the tree memory 308) under control of software for converting the routing table into tree memory instructions, herein a "tree program generator".

In a preferred embodiment, the high-level processor 208 may maintain the routing table dynamically, i.e., updating it in response to new information from the network 102 so that it is always current. The high-level processor 208 may occasionally generate a new set of tree memory instructions in response to the routing table, and place the new set of tree memory instructions into the tree memory 308. For example, the high-level processor 208 may generate the new set of tree memory instructions in response to events that are likely to cause the tree memory 308 to be "out of date", such as major changes in the routing table, and may also periodically, such as in response to a timer, recognize that sufficient time has passed to require the tree memory 308 to be updated.

In a preferred embodiment, the tree program generator may divide the tree memory 308 into a set of functional subsections ("subtrees"), each of which may parse and recognize a portion of each packet 106. For example, a first subtree 803 may parse and recognize information relating to protocol classification, a second subtree 803 may parse and recognize information relating to source-route bridging, and a third subtree 803 may parse and recognize information relating to a particular set of destination addresses. Each subtree may be coupled to the static section 805 of the tree memory 308.

Since each subtree 803 may comprise an independent program for parsing and recognition of information about the packet 106, the tree program generator 801 may independently generate information for each subtree 803, and place those subtrees 803 in the tree memory 308. In particular, the tree program generator 801 may independently generate information regarding each set of destination addresses, and may generate a subtree for each such set.

In a preferred embodiment, the tree program generator 801 may generate a separate functional subtree 803 for each packet protocol type. As host addresses for each protocol type are parsed and recognized, the high-level processor 208 may add them to the routing table 802 using a weighted tree representation 804. The high-level processor 208 may generate a weighted tree 804 of addresses, weighted by usage so that a minimal number of comparisons may generally be needed to recognize each address.

For example, in a weighted tree 804, a likely host 102 address may be placed near the top of the weighted tree 804, so that it may be disposed of early in testing. If hosts A, B, C, D, E, F and G are added to the weighted tree 804, but host G receives the vast bulk of packets 106, host G should be placed at the top of the weighted tree 804. Because the likely host address is more common, testing for it early should reduce the average number of tests to be performed. Weighted trees are known in the art, as are methods for generating them.

The tree program generator 801 may also perform destination aggregation. Where there are plural destinations that can all be switched in response to a common subset of the full address, the tree program generator 801 may generate a single functional subtree 803 to recognize the common subset and switch the packet 106 uniformly in response thereto. For example, if two different destinations are always switched to the same output network interface 201, the tree program generator 801 may generate a single functional subtree 803 to recognize their common subset and switch to that output network interface 201, regardless of whether differential processing will occur elsewhere along the path to the final destination, after the packet 106 is switched.

The tree program generator 801 may also perform common subtree elimination. Prior to placing a functional subtree 803 to the tree memory 308, the tree program generator 801 may review the subtree 803 and combine any nodes that are identical. In a preferred embodiment, this operation may be performed before converting the weighted tree 804 to tree memory format.

The tree program generator 801 may also perform other known optimizations on the functional subtrees 803 before placing them to the tree memory 308, such as peephole optimization and other forms of optimization known in the art.

The tree program generator 801 may then generate the weighted tree 804 by generating instructions in a tree memory format, forming those instructions into a functional subtree 803, and linking that functional subtree 803 to other functional subtrees 803 in the tree memory 308 or to the static section 805 in the tree memory 308. Where necessary, the tree program generator 801 may trim the set of functional subtrees 803 to fit into the tree memory 308, for example by removing rare cases and converting them into calls on the high-level processor 208 to complete the parsing of that packet 106.

In a preferred embodiment, the switching engine 206 may also comprise a watchdog timer (not shown), that must be reset periodically. Watchdog timers are known in the art. If the watchdog timer is not reset, an interrupt may be generated for the switching engine 206, the switching processor 205 may seize control of switching the packet 106, and the high-level processor 208 may be interrupted to take over switching the packet 106. The watchdog timer prevents the switching engine 206 from entering an endless loop for a particular packet 106; it thus also serves as a check on the tree program generator 801 so that functional subtrees 803 with endless loops therein are not loaded into the tree memory 308 (or at least are recognized when the tree memory 308 attempts to execute them).

In a preferred embodiment, the high-level processor 208 may place diagnostic functional subtrees 803 into the tree memory 308, present test packets 106 to these diagnostic functional subtrees 803 for testing, and examine the results produced by the tree memory 308. This allows the high-level processor 208 to test the tree memory 308.

As noted herein, it may occur that the tree memory 308 is not large enough to hold a tree program 803 for matching the entire set of destination addresses. Accordingly, the tree program generator 801 may periodically generate tree programs 803, in response to observed traffic patterns, that are limited to the size of the tree memory 308, and that will have the minimal (or at least near-minimal) likelihood of a destination address not being matched by the tree memory 308. When a destination address is not matched by the tree memory 308, it may call upon the high-level processor 208 to match the destination address using the complete routing table.

Instruction Decoder

As described herein, the instruction 314 may comprise an eight bit data word. The instruction 314 may comprise a clock-in bit, for indicating that the instruction decoder 316 should direct the packet pointer 410 to be incremented to point to a next byte of the packet 106, and a checksum bit, for indicating that the instruction decoder 316 should direct the checksum device 305 to incorporate the next byte of the packet 106 in a checksum.

In a preferred embodiment, a remaining six bits of the instruction 314 may comprise an instruction opcode, for designating one of a plurality of possible instructions for the instruction decoder 316 to implement. Instruction opcodes are known in the art.

In a preferred embodiment, the instruction opcode may comprise one of a set of instruction opcodes for implementing processor tasks suited to switching processors. Such sets of instruction opcodes are known in the art. The following list of operations designated by such instruction opcodes is preferred. (Each operation is followed by its hexadecimal opcode value in parenthesis.)

NOP (00). No operation; do nothing.

CALL (01). Call a subroutine: load the return address register 328 with the current tree memory address, and transfer control to the next tree memory address. Subroutine calls are not nested in a preferred embodiment. A RET (return) instruction 314, or a return forced by a predefined condition, returns control to the location after the CALL instruction 314.

HANG (02). Stop operation, and generate an error signal that the switching processor 205 may detect.

RET (03). Return from a subroutine: use the contents of the return address register 328 as the next tree memory address and force a ">" comparison result. Because the RET instruction 314 forces a ">" result, it is common to compare with hexadecimal FF before a CALL instruction 314 so the "<" or "=" branches are taken for the call.

NEXT_DMA (04). Instruct the DMA device 302 to input the next packet 106.

AND_PIPE (05). Perform a logical "AND" of the holding register 303 with the next data value 313 from the tree memory 308, and store the result in the holding register 303.

LD_COUNT1 (06). Load the first counter register 321 with a data word from the holding register 303. A forced return occurs when the counter register 321 reaches zero. This allows the tree memory 308 to set a counter to indicate a number of data words of the packet 106 to examine, and continue to examine those data words in a loop until the counter reaches zero.

LD_COUNT0 (07). Same as the $LD_{13}$ COUNT1 instruction 314, except that the zeroth counter register 321 is loaded.

As noted herein, a "forced return" occurs when a counter 321 reaches zero. The location in the return address register 329 is selected as the next address for the tree memory 308, and the ">" output from the comparator 307 is forced to be enabled. This allows counting down of a variable length fields, for example, by loading a length value for the field into a counter 321 and calling a subroutine that processes each data word in the field. When the counter 321, a forced return occurs, and processing of the variable length field is complete.

SET_DEC (08). Enable the zeroth and first counter register 321 to decrement. Once loaded with a nonzero value and enabled, a counter register 321 is decremented by one each time a RD_BYTE instruction is executed.

RST_DEC (09). Disable the zeroth and first counter register 321 from decrementing.

LD_SPAGE (0A). Load the scratchpad page register (not shown) with the next data value 313 from the tree memory 308. The page register is automatically incremented when the LD_SREG_15 or RD_SREG_15 instruction 314 is executed, and is automatically loaded with the next data value 313 from the tree memory 308 when the DONE instruction 314 is executed.

The page register indicates which set of memory locations are being used for the reorder registers 304 and feedback registers 317. In a preferred embodiment, bit 7 of the page register indicates whether the page is a set of reorder registers 304 or a set of feedback registers 317.

XOR_SREG_B (0B). Perform a logical "XOR" of the holding register 303 with the contents of scratchpad register 0B (either a reorder register 304 or a feedback register 317, depending upon the page register).

RD_RAND (0C). Read an 8-bit pseudorandom number into the holding register 303, and perform a logical "AND" with the next data value 313 from the tree memory 308.

RD_CKSUM (0D). Read the output from the checksum device 305 into the holding register 303, and clears the output from the checksum device 305.

DONE (0E). Set the "DONE" signal, indicating that the switching engine 206 is done.

DEC_COUNT (0F). Decrement whichever of the zeroth or first counter registers 321 contains a nonzero value.

LD_RSLT_n (1n, n=0 to F). This is a set of 16 opcodes. Load the nth result register 318 with the next data value 313 from the tree memory 308. In a preferred embodiment, there are 16 result registers 212, labeled 0 to F in hexadecimal.

In a preferred embodiment, certain of the result registers 212 have predetermined meaning, such as a packet classification code, an output network interface, input and output packet header length, a memory address of the packet 106 for use by the rewrite engine 319, and a status code of the switching engine 206 for use by the switching processor 205.

LD_SREG n (2n, n=0 to F). This is a set of 16 opcodes. Load the nth scratchpad register with a data value. As noted herein, the designated scratchpad register may be a reorder register 304 or a feedback register 317, depending on the contents of the page register. The data value to be loaded depends on the most significant bit of the page register. If 0, the next data value 313 from the tree memory 308 is used. If 1, the next data word from the packet 106 is used.

RD_SREG n (3n, n=0 to F). This is a set of 16 opcodes. Read the nth scratchpad register into the holding register 303. The contents of the scratchpad register are logical "AND"-ed with the next data value 313 from the tree memory 308 before storing into the holding register 303.

Parallel Operation of the Switching Processor and Engine

The switching processor 205 and the switching engine 206 may be considered to collectively comprise a parallel processor for quickly switching packets 106.

A general purpose processor generally comprises an instruction fetch element for fetching instructions from an instruction memory, one or more execution elements for executing the instructions that are fetched, a data fetch element for fetching data from a data memory for execution, and a write back element for writing results of execution back to the data memory.

The switching processor 205 and switching engine 206 may be considered to comprise similar elements, where packets 106, rather than data words, are the elements for fetch and execution. In this view, the instruction fetch element may comprise the network interface 201 and related means for retrieving a packet 106 from a network 102. The execution element may comprise the switching engine 206; a preferred embodiment of the invention may comprise more than one switching engine 206, operating in conjunction with the switching processor 205. The data fetch element may comprise the rewrite engine 319 and means for adjusting the packet header after the switching engine 206 has completed. The write back element may comprise packet 106 post-processing and means for moving the packet 106 to an output queue for switching.

Switching Engine Speed

The switching engine 206 is capable of fetching two data elements, comparing them, testing a result of a prior comparison, and executing an instruction in response to that result, all in a single clock cycle. The switching engine 206, operating in cooperation with the switching processor 205 and the high-level processor 208, is capable of switching about 300 kilopackets per second or more when operating with a clock cycle of about 30 nanoseconds (for the switching engine 205, twice that for the switching processor 206, and much greater for the high-level processor 208).

The switching engine's speed compares favorably with a switching speed of about 50 to 100 kilopackets per second achieved by devices having a similar clock cycle but not using a switching engine 206 as described herein.

Alternative Embodiments

While preferred embodiments are disclosed herein, many variations are possible which remain within the concept and scope of the invention, and these variations would become clear to one of ordinary skill in the art after perusal of the specification, drawings and claims herein.

We claim:

1. A device for switching packets, comprising a first memory coupled to a network interface, said first memory being large enough to hold a packet data word;

a comparator having a first input coupled to said first memory and having a second input;

a second memory having a first input coupled to a comparison output of said comparator, and having a second input, said first and second inputs of said second memory collectively referencing a location in said second memory;

at least part of said location comprising a next data word and being coupled to said second input of said comparator;

at least part of said location comprising a next address and being coupled to said second input of said second memory; and at least part of said location comprising a next instruction word, said next instruction word being coupled to an instruction decoder.

2. A device as in claim 1, comprising a set of counters, wherein a counter comprises means for decrementing upon reading a data word of said packet;

means for, when said counter has not reached a predetermined counter value, coupling said next address to said second memory, and when said counter reaches said predetermined counter value, coupling a selected address to said second memory.

3. A device as in claim 1, comprising a set of feedback registers coupled to an output of said second memory and to said instruction decoder.

4. A device as in claim 1, comprising a set of reorder registers coupled to said first memory and to said instruction decoder.

5. A device as in claim 1, comprising a set of result registers coupled to said second memory and to said instruction decoder; and a rewrite engine coupled to said first memory and to said set of result registers.

6. A device as in claim 1, wherein a packet having said packet data word may comprise one of a plurality of packet transmission protocols.

7. A device as in claim 1, wherein said comparison output comprises a plurality of output signals;

said second memory comprises a plurality of memory sections, each coupled to at least one of said plurality of output signals, whereby exactly one of said plurality of memory sections is referenced by said plurality of output signals.

8. A device as in claim 1, wherein said instruction decoder comprises a next word circuit coupled to at least part of said next instruction word;

a checksum bit circuit coupled to at least part of said next instruction word, said checksum bit circuit being coupled to a checksum device;

an opcode circuit coupled to at least part of said next instruction word, to a done bit, and to said checksum bit;

said opcode circuit configured to recognize a first instruction for setting said done bit to a first predetermined value; and said opcode circuit configured to recognize a second instruction for setting said checksum bit to a second predetermined value, whereby said checksum device operates in response to said second instruction.

9. A device as in claim 8, wherein said opcode circuit is configured to recognize a third instruction for testing an output of said checksum device.

10. A device as in claim 1, wherein said instruction decoder comprises an opcode circuit coupled to at least part of said next instruction word, to a counter, and to a return location register;

said opcode circuit configured to recognize a CALL instruction for calling a subroutine, and responsive to said CALL instruction by placing a value in said return location register;

a circuit coupled to said counter and configured to recognize a predetermined value held therein, and configured to retrieve a value from said return location register and to forcing a predetermined result from said comparator in response thereto.

11. A device as in claim 10, wherein said counter is configured to change state each time a packet data word is read from said first memory.

12. A device as in claim 10, wherein said counter is configured to change state each time a packet data word is read from said first memory, responsive to an enabling circuit, and wherein said opcode circuit is coupled to said enabling circuit and configured to put said enabling circuit in a predetermined state in response to an instruction.

13. A device as in claim 10, wherein said opcode circuit is configured to recognize a RETURN instruction for returning from a subroutine, and responsive to said RETURN instruction by retrieving a value from said return location register and by forcing a predetermined result from said comparator.

14. A device as in claim 1, wherein said instruction decoder comprises an opcode circuit coupled to at least part of said next instruction word, to a memory page register, and to a third memory having a plurality of sets of addressable reorder registers and a plurality of sets of addressable feedback registers;

said memory page register comprising a first circuit indicating a choice between said reorder registers and said feed-back registers;

said memory page register comprising a second circuit indicating a choice of one of said plurality of sets of reorder registers and one of said plurality of sets of feedback registers; and said opcode circuit configured to recognize a first set of instructions, each for addressing and altering one of said reorder registers, and a second set of instructions, each for addressing and altering one of said feedback registers.

15. A device as in claim 14, wherein said opcode circuit is configured to alter said memory page register in response to an instruction.

16. A device as in claim 7, wherein said plurality of output signals comprise a less than signal, an equal to signal, and a greater than signal; and said plurality of memory sections comprises a section activated by said less than signal, a section activated by said equal to signal, and a section activated by said greater than signal.

17. A device as in claim 7, wherein said second memory comprises a location in each one of said plurality of memory sections for each address coupled to said second memory.

18. A device for switching packets, comprising means for receiving a packet from a first one network interface of a plurality of network interfaces;

a tree memory comprising a set of locations each having a next data word, a next address and a next instruction word, said set of locations comprising a first region comprising a tree program for routing packets in response to a set of static routing information about a network coupled to said first one network interface;

means for receiving dynamic routing information about said network;

means for compiling said dynamic routing information into a second region in said set of locations; and means for sending said packet to a second one of said plurality of network interfaces in response to said tree memory.

19. A device as in claim 18, comprising means for identifying routing information in said packet in response to said tree memory; and means for directing said means for sending to switch said packet in response to said means for identifying.

20. A device as in claim 19, comprising means for receiving dynamic routing information about a network, said network being coupled to said first one network interface;

means for compiling said dynamic routing information into a region in said tree memory.

21. A device as in claim 20, said tree memory comprising static routing information about said network.

22. A device as in claim 18, wherein said dynamic routing information comprises information about locations of devices coupled to said network or information about access control for devices coupled to said network.

23. A device as in claim 18, wherein said static routing information comprises information about a protocol used on said network.

24. A device for switching packets, comprising means for receiving a packet from a first one of a rality of network interfaces;

means for preparing an interface register in response to said packet;

a tree memory having a set of locations each having a next data word, a next address and a next instruction word;

an instruction decoder coupled to said next instruction, word and to a result register;

means for signaling said tree memory to process said packet;

means for altering said packet in response to said result register;

means for selecting a second one of said plurality of network interfaces in response to said result register;

means for sending said packet to said second one network interface.

25. A device for switching packets, comprising means for receiving a packet from a first one of a plurality of network interfaces;

means for sending said packet to a second one of said plurality of network interfaces;

means for switching said packet from said first one network interface to said second one network interface;

said means for switching having a clock cycle time defined to equal a shortest time needed to decode a processor instruction, and having a clock cycle rate defined to equal an inverse of said clock cycle time;

said means for switching having a packet switching rate defined to equal an average rate of switching packets from said first to said second one network interface, said average rate being determined for a substantial time period that is not predetermined, said average being true for a packet traffic distribution that is not predetermined, and said average rate being sustainable in excess of a selected value for a substantial period of time;

said clock cycle rate divided by said packet switching rate being less than about 100 clock cycles per packet switched.

26. A device as in claim 25, wherein said clock cycle time is not less than about 30 nanoseconds and said packet switching rate is greater than about 300,000 packets per second.

27. A device as in claim 25, wherein said packet traffic distribution is a normal distribution for packets being switched on said first one network interface.

28. A device for switching packets, comprising means for receiving information from a network interface coupled to a network, said information comprising destination addresses;

means for converting said information to tree programs for a tree memory, said tree programs comprising data in a set of locations for said tree memory, said data selected in response to said information;

means for executing said tree programs;

wherein each one of said tree programs comprises a tree structure, said tree structure comprising a root node, a plurality of nonterminal branch nodes coupled to said root node, and a set of terminal nodes coupled to said nonterminal branch nodes, each one of said nonterminal branch nodes having a plurality of said nodes coupled thereto;

wherein each nonterminal branch node in said tree structure comprises a register for storing a data item for comparison and an instruction word.

29. A device as in claim 28, comprising means for placing said tree program in a tree memory.

30. A device as in claim 28, comprising means for triggering said means for converting said information to tree programs for a tree memory, responsive to a timer.

31. A device as in claim 28, comprising means, responsive to said information, for triggering said means for converting said information to tree programs for a tree memory.

32. A device for switching packets, comprising means for receiving information from a network interface coupled to a network, said information comprising destination addresses;

means for converting said information to tree programs for a tree memory, said tree programs comprising data in a set of locations for said tree memory, said data selected in response to said information;

means for executing said tree programs;

wherein said tree memory comprises a comparator having a first input coupled to said tree first memory and having a second input;

a second memory having a first input coupled to a comparison output of said comparator, and having a second input, said first and second inputs of said second memory collectively referencing a location in said second memory;

at least part of said location comprising a next data word and being coupled to said second input of said comparator;

at least part of said location comprising a next address and being coupled to said second input of said second memory; and at least part of said location comprising a next instruction word and being coupled to an instruction decoder.

33. A device for switching packets, comprising means for receiving information from a network interface coupled to a network, said information comprising destination addresses;

means for converting said information to tree programs for a tree memory, said tree programs comprising data in a set of locations for said tree memory, said data selected in response to said information;

means for executing said tree programs;

wherein said means for converting comprises means for generating a tree program for recognizing a set of destination addresses in said information;

means for placing said tree program in a tree memory for execution.

34. A device for switching packets, comprising means for receiving information from a network interface coupled to a network, said information comprising destination addresses;

means for converting said information to tree programs for a tree memory, said tree programs comprising data in a set of locations for said tree memory, said data selected in response to said information;

means for executing said tree programs;

wherein said means for converting comprises means for generating a weighted tree of destination addresses; and means for generating a tree program responsive to said weighted tree, wherein said tree program comprises at least one call upon a high-level processor for processing a packet, and wherein said tree program is limited to a predetermined size, and wherein said tree program is structured to have a minimum likelihood per packet of executing said call.

35. A method of packet switching, comprising coupling a data word from a packet received from a first one of a plurality of network interfaces to a first input of a comparator;

addressing a memory in response to an output of said comparator;

retrieving an output of said memory;

coupling at least part of said output of said memory to a second input of said comparator;

coupling at least part of said output of said memory to an address input of said memory;

coupling at least part of said output of said memory to an instruction decoder, said instruction decoder being coupled to a processing element;

repeating said steps of coupling a data word, addressing, retrieving, coupling to a second input, coupling to an address input, and coupling to a processing element, at least until said processing element prepares a result data word indicative of a second one of said plurality of network interfaces, and said instruction decoder recognizes a part of said output as indicative of readiness to switch said packet; and sending said packet to said second one of said plurality of network interfaces.

36. A method for switching packets, comprising receiving a packet from a first one of a plurality of network interfaces;

performing a plurality of tree memory operations, each said tree memory operation comprising simultaneously (a) retrieving a first data word from said packet, (b) comparing a second data word from said packet with a test data word, (c) executing a processor instruction in response to a prior tree memory operation, and (d) selecting a next tree memory operation in response to said prior tree memory operation;

at least one said step of executing a processor instruction comprising preparing a result data word indicative of a second one of said plurality of network interfaces; and sending said packet to said second one of said plurality of network interfaces.

* * * * *

UNITED STATES PATENT AND TRADEMARK OFFICE
CERTIFICATE OF CORRECTION

PATENT NO. : 5,509,006
DATED : April 16, 1996
INVENTOR(S) : Bruce A. Wilford; Bruce Sherry; David Tsiang; Anthony Li It is certified that error appears in the above-indentified patent and that said Letters Patent is hereby corrected as shown below:

On Column 2, line 61, after "Leonard" insert --Bosack--.

On Column 12, line 63, replace "[.+.9B]" with --{--.+.9B]--.

On Column 20, line 1, replace "$LD_{13}COUNT1$" with --LD_COUNT1--.

On Column 21, line 1, replace "RD_SREG n" with --RD SREG n--.
On Column 24, line 27, replace "rality" with --plurality--.

Signed and Sealed this

Seventh Day of January, 1997

Attest:

BRUCE LEHMAN

*Attesting Officer*     *Commissioner of Patents and Trademarks*